United States Patent Office 2,786,055
Patented Mar. 19, 1957

2,786,055

CARBOXYALKYL-IODOQUINAZOLONES

Vernon H. Wallingford, Ferguson, Mo., and Margaret F. Kruty, Chicago, Ill., assignors to Mallinckrodt Chemical Works, St. Louis, Mo., a corporation of Missouri No Drawing. Application February 10, 1955, Serial No. 487,460

8 Claims. (Cl. 260—251)

This invention relates to halogenated compounds and more particularly to novel derivatives of iodinated quinazolones and their salts and esters.

Briefly, the invention relates to iodinated quinazolone compounds having the formula:

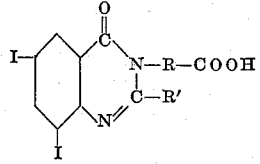

where R is a methylene, polymethylene or an alkyl-substituted methylene or polymethylene radical, and R' is an alkyl radical, and the nontoxic salts and esters thereof. The present invention also includes methods which comprise treating iodinated 2-acylaminobenzoyl-amino acids with an excess of an alkali to form iodinated quinazolones. The invention further includes methods which comprise reacting anhydro iodinated derivatives of 2-acylaminobenzoic acids with an amino acid to form iodinated 2-acylaminobenzoyl-amino acids and treating said benzoyl amino acids with an excess of an alkali.

Among the objects of this invention may be mentioned the provision of new compounds which are derivatives of quinazolone compounds and which contain a plurality of iodine atoms; the provision of compounds of the type indicated which are useful intermediates for the preparation of other compounds of related structure; the provision of improved contrast media for X-ray diagnosis; the provision of such media which are useful when administered orally; the provision of such media which are useful for visualization of the gall bladder; and the provision of methods for preparing compounds of the type referred to which are efficient and economical. Other objects and features will be in part apparent and in part pointed out hereinafter.

The invention accordingly comprises the products and methods hereinafter described, the scope of the invention being indicated in the following claims.

In accordance with the present invention it has been found that iodinated quinazolones may be readily and conveniently prepared by treating iodinated 2-acylamino-benzoyl-amino acids with an excess of alkali. Additionally, it has been found that iodinated quinazolones may be prepared by treating anhydro iodinated derivatives of 2-acylaminobenzoic acids with amino acids in the presence of excess alkali, for the example, sodium hydroxide. It is preferred that the product of the above described reaction be treated with additional alkali to insure substantially complete conversion of the iodinated benzoyl derivatives of amino acids to the respective quinazolones. It will be understood that in place of sodium hydroxide other strong alkalies, such as potassium hydroxide, may be employed to close the quinazolone ring.

The above described reactions may be represented as follows:

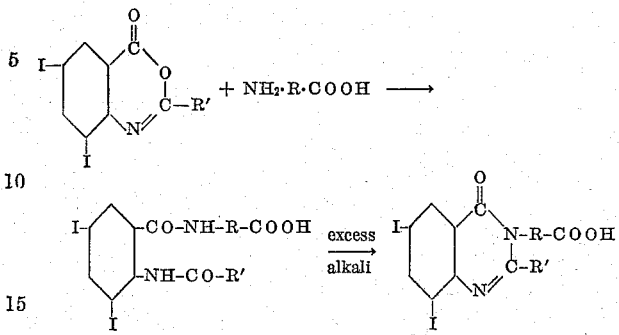

It has also been found in accordance with the present invention that certain iodinated quinazolones, particularly those represented by the formula:

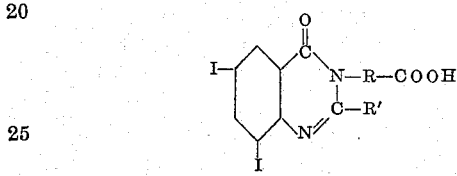

where R is a methylene, polymethylene, or an alkyl-substituted methylene or polymethylene radical, and R' is an alkyl radical, are especially useful as contrast agents for roentgenography.

The compounds of the present invention may be employed in the form of powders, tablets or liquids which are prepared by means well known to those skilled in the art. It is usually preferable to employ the compounds in the form of one of their physiologically innocuous salts. It may sometimes be desirable to employ the X-ray contrast media in a nonaqueous solid medium such as an oil, in which case one of the esters of the acid may have more satisfactory physical properties than the acid itself or one of its salts.

The compounds of the present invention are useful for many roentgenographic procedures, e. g., urography, cholecystography, gastro-intestinal roentgenography, and for visualization of other systems and cavities in the body.

The following examples illustrate the invention.

Example 1

A solution of anhydro-2-acetylamino-3,5-diiodobenzoic acid (230 g., 0.56 mole) in dioxane (445 ml.) was poured into a solution of β-alanine (100 g., 1.11 mole) in water (445 ml.) containing 35° Bé. sodium hydroxide (89 ml., 0.86 mole). This mixture was stirred overnight, filtered, diluted with water to 7 liters and acidified with glacial acetic acid. After being digested for one hour at 80°–90° C. the solid was separated by filtration and dried overnight in an oven at 70° C. The yield of crude N-2(acetylamino-3,5-diiodobenzoyl)-β-alanine was 249 g. A portion of this material (149 g.) was dissolved in boiling 1 N sodium hydroxide (1500 ml.) and the solution was refluxed for ten minutes. After being diluted to 7 liters, the solution was acidified first with glacial acetic acid and then concentrated hydrochloric acid. This suspension was digested at 80°–90° C. for thirty minutes and allowed to cool to room temperature overnight. The solid was separated by filtration and dried overnight in an oven at 70° C. The yield of semi-crude 3-(β-carboxyethyl)-6,8-diiodo-2-methylquinazolone was 137 g. (85% of overall theory). On heating the compound melted with decomposition at 253.4–254.4° C. After recrystallization from ethanol-dioxane, the yield of 3-(β-carboxyethyl)-6,8-diiodo-2-methylquinazolone was 123 g. (76.5% of overall theory). On heating the compound melted with decomposition at 256.4–257.4° C. Calculated for $C_{12}H_{10}I_2N_2O_3$: neutral equivalent 484; found: neutral equivalent 480. The solubility of the sodium salt was found to be 28 g./100 ml. of water at 25° C. The toxicity of the sodium salt was determined in male albino mice, and the $LD_{50}$ was found to be 350 mg./kg. When administered orally in dogs at dosages of 100 mg./kg. and 200 mg./kg. and intravenously at 100 mg./kg., the sodium salt produced a shadow of the gall bladder.

*Example 2*

A solution of anhydro-2-acetylamino-3,5-diiodobenzoic acid (23 g., 0.056 mole) in hot (60° C.) dioxane (50 ml.) was cooled rapidly to 20° C. with vigorous stirring. dl-α-Aminovaleric acid (13 g., 0.11 mole) was added to water (50 ml.) containing 35° Bé. sodium hydroxide (11 ml., 0.11 mole). This mixture was added with stirring to the cooled suspension above. After being stirred overnight the solution was treated with diatomaceous earth, filtered, diluted with water to 2 liters, and acidified with glacial acetic acid. The precipitated solid was separated by filtration, dissolved in 1 N sodium hydroxide (250 ml.) and boiled for ten minutes. After being diluted to 2 liters the solution was acidified with glacial acetic acid. The solid was separated by filtration and dried overnight in an oven at 70° C. The yield of crude 3-(α-carboxybutyl)-6,8-diiodo-2-methylquinazolone was 13.2 g. (47% of theory). After being recrystallized from ethanol-dioxane the yield of 3-(α-carboxybutyl)-6,8-diiodo-2-methylquinazolone was 10.3 g. (36.8% of theory). On heating the compound melted with decomposition at 254° C. Calculated for $C_{14}H_{14}I_2N_2O_3$: neutral equivalent 512; found: neutral equivalent 509. The solubility of the sodium salt was found to be 48.0 g./100 ml. of water at 25° C. The toxicity of the sodium salt was determined in male albino mice, and the $LD_{50}$ was found to be 1450 mg./kg. When administered intravenously in dogs at dosage levels of 100 mg./kg. and 200 mg./kg., the sodium salt produced an outline of the gall bladder.

*Example 3*

Sodium hydroxide (31.4 g., 0.79 mole) and a 65% solution of ε-aminocaprolactam (62.5 g., 0.36 mole) were added to water (20 ml.). The resulting mixture was heated under reflux with stirring until it becomes homogeneous. After cooling to 70° C., water (900 ml.) and concentrated hydrochloric acid (32 ml.) were added. Then the solution was cooled to room temperature. To this a solution of anhydro-2-acetylamino-3,5-diiodobenzoic acid (103 g., 0.25 mole) in dioxane (1000 ml.) was added all at once. A thick slurry formed which, after being stirred for three hours, became a homogeneous solution. The following morning the solution was filtered, diluted with water to 4 liters, and acidified with glacial acetic acid to pH 5. The product was coagulated somewhat by being heated at 70° C. for one hour on a steam bath. The solid was separated by filtration, washed with water, and then placed in 1 N sodium hydroxide (1 l.). This solution was heated under reflux for ten minutes, cooled to 60° C., diluted to 4 liters and acidified with glacial acetic acid. After coagulation at 70° C. for one hour the crude 3-(ε-carboxypentyl)-6,8-diiodo-2-methylquinazolone was separated by filtration. After being recrystallized from alcohol-dioxane-water, the yield of 3-(ε-carboxypentyl)-6,8-diiodo-2-methylquinazolone was 75 g. (57% of theory). On heating the compound melted at 187.5–189.5° C. Calculated for $C_{15}H_{16}I_2N_2O_3$: neutral equivalent 526; found: neutral equivalent 528. The solubility of the sodium salt was found to be 36.8 g./100 ml. of water at 25° C. The toxicity of the sodium salt was determined in male albino mice, and the $LD_{50}$ was found to be 460 mg./kg. When administered orally, the sodium salt produced good shadows of the gall bladder in both dogs and cats at dosages of 50 mg./kg. and 100 mg./kg. This compound was also found to be equally effective when administered intravenously in dogs.

*Example 4*

A solution of anhydro-2-butyrylamino-3,5-diiodobenzoic acid (143 g., 0.29 mole) in warm (60° C.) dioxane (280 ml.) partially crystallized when cooled to room temperature. To the stirred suspension was added a solution of β-alanine (58.5 g., 0.65 mole) in water (280 ml.) containing 35° Bé. sodium hydroxide (52 ml., 0.49 mole.) This mixture was stirred for three hours. During this period it first tended to become thin but later a bulky precipitate slowly filled the solution, making stirring difficult. The following morning the suspension was diluted with water to 4 liters, treated with diatomaceous earth and filtered. After being diluted with water to 7 liters, the solution was acidified with glacial acetic acid. After being digested at 90° C. for one hour the precipitate was separated by filtration. The material was added to 1 N sodium hydroxide (1500 ml.) and the resulting solution was heated under reflux for ten minutes. After being diluted to 5 liters and acidified with concentrated hydrochloric acid, a precipitate was separated by filtration. It was resuspended in water (5 l.), filtered again, and allowed to dry in air overnight. The yield of 3-(β-carboxyethyl)-6,8-diiodo-2-propylquinazolone was 109 g. (66% of theory). On heating the compound melted at 198–199° C. Calculated for $C_{14}H_{14}I_2N_2O_3$: neutral equivalent 512; found: neutral equivalent 527. This value indicates a mixture of the desired quanazolone 3-(β-carboxyethyl)-6,8-diiodo-2-propylquinazolone, with N-(2-acetylamino-3,5-diiodobenzoyl)-β-alanine. The material was then retreated with 1 N sodium hydroxide for thirty minutes. This product had a neutral equivalent of 522. The solubility of the diethanolamine salt was found to be greater than 33.0 g./100 ml. of water at 25° C. The toxicity of the sodium salt was determined in male albino mice, and the $LD_{50}$ was found to be 300 mg./kg. The compound was administered intravenously in dogs at dosage levels of 50 mg., 100 mg., and 150 mg./kg. Elimination of the compound was through the urinary system.

For the purposes of brevity, it will be understood that quinazolone compounds, other than the particular exemplary quinazolones (the detailed preparation of which was set forth in the preceding working examples), are conveniently prepared by following the methods described above and substituting amino acids and anhydro iodinated derivatives of 2-acylaminobenzoic acids other than those previously specifically named. Examples of such other amino acids are blutamic acid, glycine, α-aminophenylacetic acid, aspartic acid, hydroxyglutamic acid, valine, leucine, norleucine, isoleucine, phenylalanine, serine, threonine, tyrosine and diiodotyrosine. Amino acids other than α-amino acids are similarly useful, provided that the carbon atom to which the amino group is attached is not a part of an unsaturated cyclic nucleus and any other substituents which are present are substantially unreactive towards the particular anhydro acylaminobenzoic acid used as a starting material. Preferably, amino acids are employed in which the carbon atom to which the amino group is attached is a saturated aliphatic carbon atom. An example of such other anhydro iodinated derivatives of 2-acylaminobenzoic acids is anhydro-2-(n-caproylamino)-3,5-diiodobenzoic acid. The compounds of the present invention are also conveniently prepared by treating iodinated 2-acylaminobenzoyl derivatives of amino acids, such as 2-acetylamino-3,5-diiodohippuric acid, N-(2-acetylamino-3,5-diiodobenzoyl)-ω-aminocaproic acid and N-(2-acetylamino-3,5-diiodobenzoyl)-glutamic acid, with an excess of an alkali as previously described.

It will also be noted that the nontoxic salts of these quinazolones, other than sodium, such as the potassium, methyl glucamine, etc. salts, are conveniently prepared by means well known to those skilled in the art, as are the alkyl (preferably lower alkyl) esters, such as the ethyl and propyl.

In view of the above, it will be seen that the several objects of the invention are achieved and other advantageous results attained.

As many changes could be made in the above products and methods without departing from the scope of the invention, it is intended that all matter contained in the above description shall be interpreted as illustrative and not in a limiting sense.

We claim:

1. A compound selected from the group consisting of compounds having the formula:

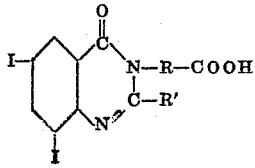

in which R is a lower alkylene radical selected from the group consisting of methylene, polymethylene, and alkyl-substituted methylene and polymethylene radicals, and R' is a lower alkyl radical, and the nontoxic esters and salts thereof.

2. 3 - (β - carboxyethyl) - 6,8 - diiodo - 2 - methyl-quinazolone.

3. 3 - (α - carboxybutyl) - 6,8 - diiodo - 2 - methyl-quinazolone.

4. 3 - (ε - carboxypentyl) - 6,8 - diiodo - 2 - methyl-quinazolone.

5. 3 - (β - carboxyethyl) - 6,8 - diiodo - 2 - propyl-quinazolone.

6. The sodium salt of 3-(ε-carboxypentyl)-6,8-diiodo-2-methylquinazolone.

7. The method of forming compounds having the following structure:

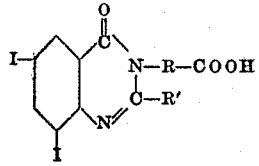

in which R is a lower alkylene radical selected from the group consisting of methylene, polymethylene, and alkyl-substituted methylene and polymethylene radicals, and R' is a lower alkyl radical, which comprises treating an iodinated acylaminobenzoyl-amino acid having the following formula:

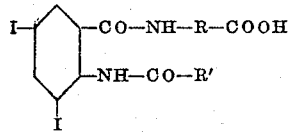

with an excess of an alkali.

8. The method of forming compounds having the following structure:

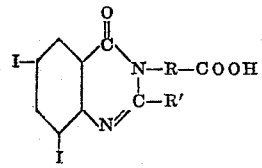

in which R is a lower alkylene radical selected from the group consisting of methylene, polymethylene and alkyl-substituted methylene and polymethylene radicals and R' is a lower alkyl radical, which comprises reacting a compound having the following formula:

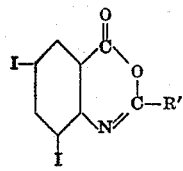

with an amino lower alkanoic acid in the presence of an excess of an alkali.

No references cited.